Nov. 3, 1959 E. E. OSTROW 2,911,461

COLORED TELEVISION SYSTEM

Filed Oct. 1, 1952

INVENTOR:
EUGENE EDWARD OSTROW
BY Peter L. Tailer
AGENT

United States Patent Office 2,911,461
Patented Nov. 3, 1959

2,911,461

COLORED TELEVISION SYSTEM

Eugene Edward Ostrow, Forest Hills, N.Y.

Application October 1, 1952, Serial No. 312,440
4 Claims. (Cl. 178—5.2)

This invention relates in general to a method for controlling the picture on a television picture tube from the place of transmission. More particularly this invention relates to a method for controlling elements in a television receiver that affect the image by setting aside a portion of the image area of a television receiver so that cathode ray sensitive means may be placed in this area to be affected by cathode rays when these rays are directed upon this area from the place of transmission.

An object of this invention is to provide a method to produce color images in a television receiver from the place of transmission by setting aside a portion of the image area of the television receiver so that at least one cathode ray sensitive means which emits light of a particular color may be placed in this set-aside area to be effected when cathode rays are directed into this area from the place of transmission so that at least some of a sequence of images produced in the receiver may be colored by the light emitted from this cathode ray sensitive means.

Another object of my invention is to provide a superior color television system using my method.

Additional objects, advantages, and features of invention reside in the construction, arrangement, and combination of parts involved in the embodiment of my invention and its practice otherwise as will be understood from the following description and accompanying drawings wherein.

Figures 1, 2, 3, 4, 5, 6:
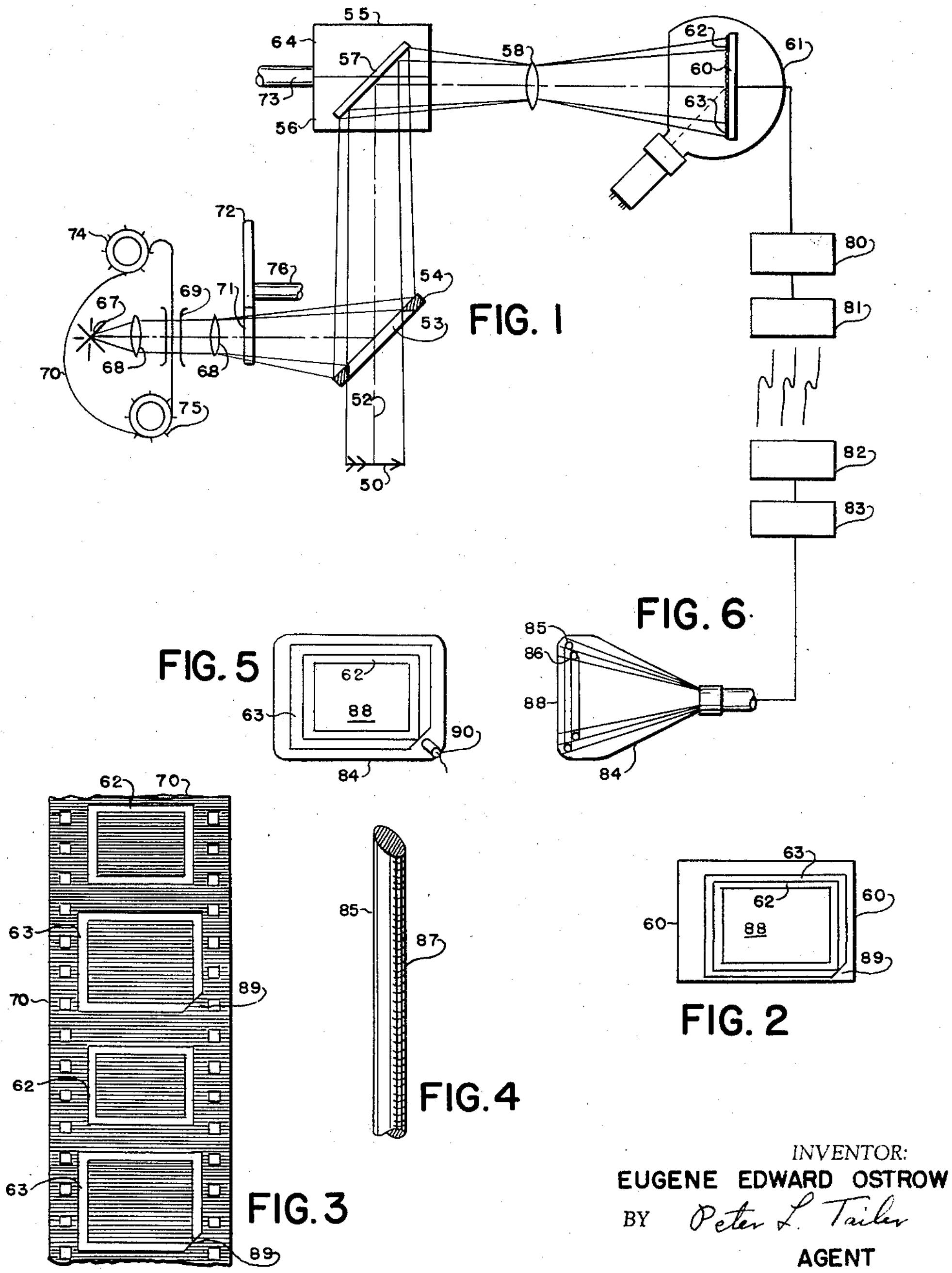
Fig. 1 is a diagram showing an embodiment of my invention as used in a color television transmission system.
Fig. 2 is a front view of the camera mosaic as it would appear in this embodiment of my invention.
Fig. 3 is a front view of a strip of film which is used in this embodiment of my invention.
Fig. 4 is a side elevation of a portion of an element that is effected by cathode rays.
Fig. 5 is a front view of a picture tube as used in a television receiver in this embodiment of my invention.
Fig. 6 is a side view of the picture tube as used in a television receiver in this embodiment of my invention.

Referring to the drawings in detail, this embodiment of my invention operates as follows. As shown in Fig. 1, a scene, picture, motion picture or the like is to be transmitted in color. The actual optical image of the scene to be transmitted is represented by the arrow 50. Light rays are reflected upwards along the optical axis 52 from the arrow 50. These light rays then pass through the square aperture 53 within the mirror 54 until they strike the mirror 57 which is placed at 45 degrees to the optical axis 52. These light rays are therefore reflected at right angles and then gathered by the lens system 58 to be focused upon the television camera mosaic 60.

Meanwhile light from a light source 67 is focused and directed by means of a lens system 68 through a standard motion picture film gate 69. This film gate 69 has the continuous strip of motion picture film 70 fed through it in the conventional manner by means of the sprockets 74 and 75. The film gate 69 has an individual frame of the film 70 stationary within it while the aperture 71 in the rotary shutter 72 which is mounted upon the shaft 76 allows light to pass from the light source 67 through the stationary film 70. As successive frames of the film 70 are jerked into the film gate 69, the rotary shutter 72 blocks the light from the light source. Thus this portion of my apparatus functions in the same manner as does a standard high speed motion picture projector. Therefore, when the shutter allows the passage of light from the light source 67, it passes through the stationary frame of the film, through the shutter, and it strikes the mirror 54.

A detailed drawing of a strip of film as used in this embodiment of my invention is shown in Fig. 3. The center portion of this film 70 that would allow light rays to fall within the square aperture 53 of the mirror 54 may be made opaque to the passage of light as shown because this portion of the film is not used. However, a smaller border area 62 about the center portions of alternate frames of the film 70 is made transparent to the passage of light. On intermediate alternate frames of the film 70 a larger border area 63 is made transparent to the passage of light. These two differing and alternating frames with the larger and smaller transparent border areas are shown clearly in Fig. 3.

Referring again to Fig. 1, a color drum 55 is mounted upon the shaft 73 so that the wall of the color drum lies about the mirror 57. The wall of the color drum 55 is divided into two transparent colored halves which act as two different colored light filters 56 and 64 so that, as the color drum rotates about its shaft 73, it interposes first one color filter 56 and then the other color filter 64 in the path of the light rays. This rotation of the color drum 55 is synchronized with the passage of the film 70 through the film gate 69 so that, as one color filter is in the path of the light rays, a frame of the film 70 having the smaller border area 62 is in the film gate 69, and while the other color filter is in the path of the light rays, a frame of the film 70 having the larger border area 63 is in the film gate 69.

The invention then operates in the following manner. As shown in Fig. 1 and Fig. 2, the image 50 is projected on the camera mosaic 60 in the picture area 88. If the color drum 55 has its two halves that act as light filters 56 and 64 being red and green absorption filters for an example, then the image 50 would have its red component of color filtered out as the smaller border area 62 of the camera mosaic 60 was illuminated. The light that illuminated this smaller border area 62 would then have passed through the film 70 in the film gate 69 to be reflected from the mirror 54 through the red absorption filter portion of the color drum 55 to be reflected again through the mirror 57 through the lens system 58 and onto the camera mosaic 60. In a like manner while the image 50 had its green component of color filtered out by the green absorption filter half 64 of the color drum 55, the larger border area 63 as shown in Fig. 2 would be illuminated.

The rapid succession of red and green light filtered images and their associated illuminated larger and smaller border areas would be transmitted from the camera mosaic 60 in the standard television transmission tube 61 in the conventional manner as the camera mosaic is scanned. The elements 80 and 81 represent the usual means associated with the transmission tube 61 to convert the scanned image on the camera mosaic into radio waves. These radio waves are then received by the standard television receiving apparatus 82 and 83. This television receiving apparatus is associated with the picture tube 84 as shown in Fig. 6.

In the practice of my invention, this picture tube 84 operates as follows. As shown in Fig. 5, alternate black and white images which represent the light remaining after the red and green components of color have been filtered out in transmission as has been described are projected onto the image area 88 of the picture tube in the conventional manner. For certain unique color effects, it may be desirable to project these successive black and white images as negative images. However, as shown in Fig. 5, when the red color filtered image is projected on the picture tube, the smaller border area 62 is struck by the cathode rays and when the green color filtered image is projected on the picture tube, the larger border area 63 is struck by the cathode rays. As shown in Fig. 4 and Fig. 6, the area before the larger border area of the picture tube and the area before the smaller border area of the picture tube may be covered by the transparent rods 85 and 86. The rod 85 which is before the large border area of the picture tube is sprayed on its surface facing the source of the cathode rays with a substance 87 such as the standard phosphors or the like that will emit a green light under the impact of cathode rays. In a like manner the transparent rod that lies before the smaller border area of the picture tube would have its front surface sprayed with a substance that would emit a red light when struck by cathode rays. In this manner alternate red and green images are produced on the front surface of the picture tube as the rods 85 and 86 alternately illuminate the image with green and red light from within the picture tube. Although I have here described a color television system using my invention, my invention is not limited to such a color television system. More than two parts of the border area in the camera mosaic and more than two parts of the border area in the picture tube may be used to provide three or more colors in my television system.

Color television need not give a true color picture to give rise to desirable results. For example, my invention could be used to tone every image in a series of images one color. An ordinary black and white picture on the picture area of the receiver could thus be partially toned brown for desert scenes, blue for sea scapes, red for fire scenes, etc. Thus old black and white motion picture films shown on a television system using my invention could be appropriately colored in the receiver from the place of transmission to add interest and artistic effect. The controlled addition of even small amounts of color changes on an otherwise grey screen can add greatly to the picture interest.

Furthermore, any portion beyond the reduced area on which is projected the actual image may be used in the camera mosaic and in the picture tube to activate elements in the receiver directly or indirectly sensitive to cathode rays. For example in Fig. 5 a photoelectric cell 90 is shown in one corner of the picture tube. If it was considered desirable to activate this photoelectric cell from the point of transmission, the opaque corner 89 of the film 70 as shown in Fig. 3 would be made transparent. As the film 70 is shown in Fig. 3, no light is passed through this corner of the film to the camera mosaic and then no cathode rays are directed to this corner of the picture tube. However, when the corner 89 is made transparent, light falls on this corner of the camera mosaic and cathode rays then impinge on this corner of the picture tube to cause an emission of light. This light may then activate the photoelectric cell which in turn may activate a circuit to effect the picture. One use contemplated for this photoelectric cell is to have it activate circuitry that would reduce the size of the television picture in the receiver until it falls entirely within the area 88. This is desirable when switching from the transmission of color to the transmission of black and white pictures because during the transmission of black and white pictures the larger and smaller border areas are not needed to activate the color imparting means in the receiver. Therefore, the entire camera mosaic can be used to transmit the image from the transmitter and the same resulting number of scanning lines can then be used completely within the actual picture area 88 of the receiver. Naturally, during color transmission and reception, some of the scanning lines are used outside the picture area 88 to activate the larger and smaller border areas to produce a sequence of colors.

Finally, my invention is not limited to having the cathode rays in the receiver directed into the peripheral area that lies beyond the actual picture area 88 from the transmitter in the exact manner shown. A beam of light need not be thrown on the camera mosaic beyond the picture area 88 to be converted into a radio signal, but an equivalent radio signal may be generated electronically in any manner well known in the art.

Although I have shown and described a preferred embodiment of my invention, it is not limited to this embodiment which is purely exemplary. Many changes, additions, modifications, and substitutions of equivalents can be made in connection therewith without departing from the spirit of this invention as herein disclosed and hereinafter claimed.

I claim:

1. A television system comprising a transmitter having a central transmission surface on which may be projected an image, peripheral transmission surfaces extending beyond said central transmission surface on which may be projected light beams, and means to scan and convert the image and the light beams on said central transmission surface and on said peripheral transmission surfaces into radio waves; and at least one receiver having means to generate and project cathode rays in response to the radio waves received from said transmitter, a central reception surface upon which said cathode rays are projected, means associated with said central reception surface to emit light upon the impact of cathode rays to produce a visible image on said central reception surface, and peripheral reception areas extending beyond said central reception surface into which cathode rays may be directed as said peripheral transmission surfaces are scanned in said transmitter, and color light emitting means responsive to cathode rays located within said peripheral reception areas coloring the visible image produced on said central reception surface with colored light from said colored light emitting means.

2. The combination according to claim 1 with the addition of color absorption filters and wherein the image projected on said central transmission surface is projected through a sequence of said color absorption filters, wherein the light beams projected on said peripheral transmission surfaces are each projected as the image is projected through one of said color absorption filters, and wherein said color light emitting means responsive to cathode rays located within said peripheral reception areas will each emit light of a given color when struck by cathode rays so that this colored light will color the visible image produced on said central reception area.

3. A picture tube for a television receiver, said picture tube having means to project and direct cathode rays according to signals received from transmission, a central picture area on which said means to project and direct cathode rays directs some cathode rays, substances associated with said picture area emitting light under the impact of cathode rays to produce visible images, at least one peripheral area within said picture tube beyond said central picture area onto which said means to project and direct cathode rays may direct additional cathode rays, and a colored light emitting substance in each peripheral area emitting light of a particular color when struck by cathode rays so that the colored light falls on said central picture area coloring an image.

4. The combination according to claim 3 in which there are a plurality of peripheral areas and wherein said peripheral areas surround said central picture area.

References Cited in the file of this patent

UNITED STATES PATENTS

| | | |
|---|---|---|
| 1,779,261 | Morehouse | Oct. 21, 1930 |
| 2,191,515 | Von Bronk | Feb. 27, 1940 |
| 2,297,444 | Von Bronk | Sept. 29, 1942 |
| 2,333,969 | Alexanderson | Nov. 9, 1943 |
| 2,369,783 | Homrighous | Feb. 20, 1945 |
| 2,611,817 | Schwartz | Sept. 23, 1952 |
| 1,731,511 | Weisen | Jan. 17, 1956 |

OTHER REFERENCES

Mannerheimer: Abstract of application Serial No. 183,624, published November 17, 1953, 676, O.G. 890.